Jan. 29, 1935.    J. W. DECKER    1,989,085
MULTIPLE STOCK QUOTATION PROJECTING MACHINE
Original Filed Sept. 25, 1929    2 Sheets-Sheet 1
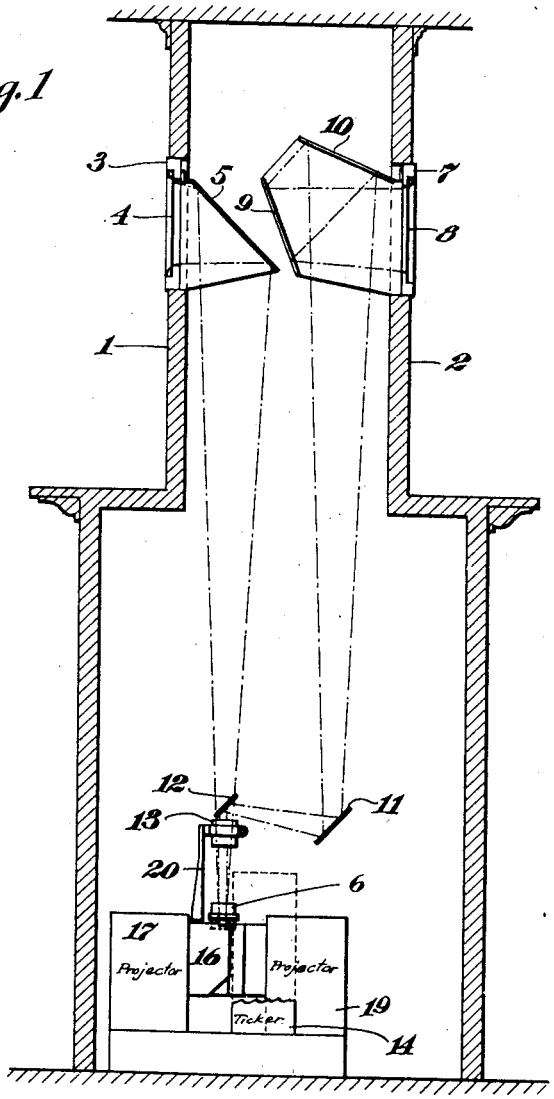
INVENTOR
James W. Decker,
BY
Gustav Drews
ATTORNEY

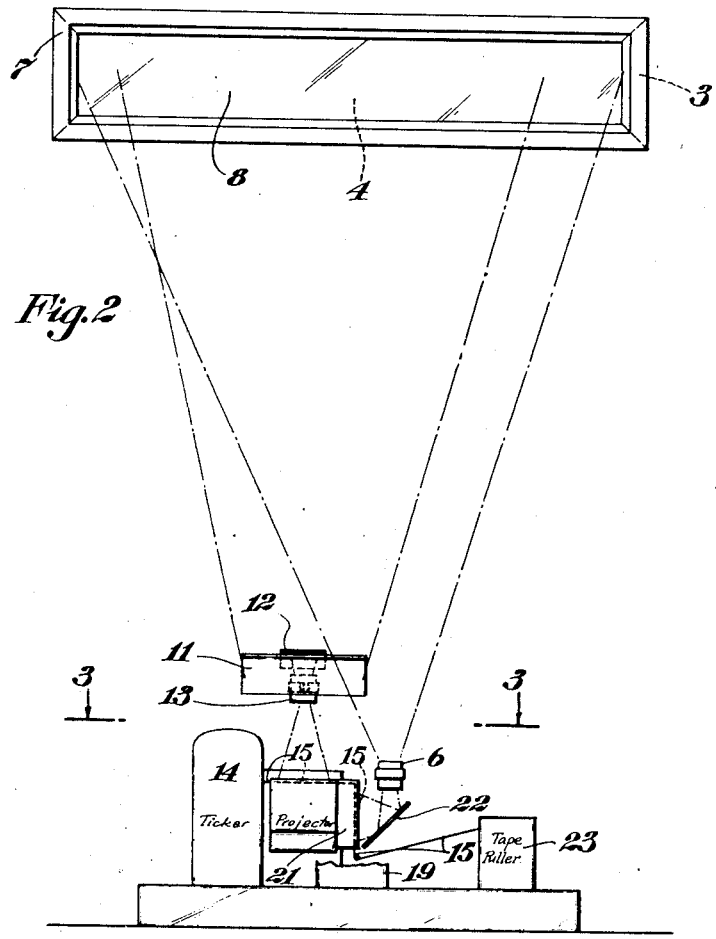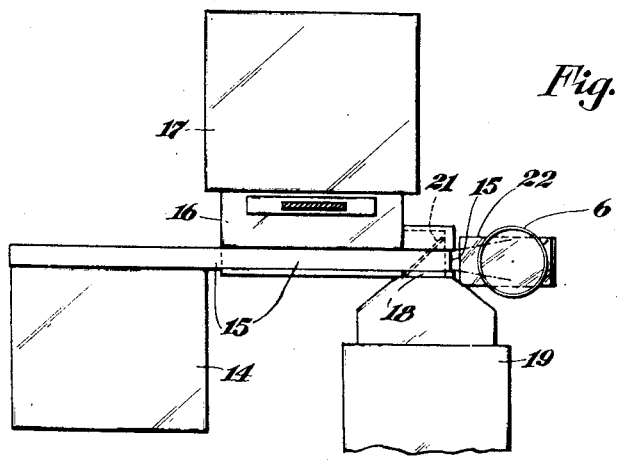

Patented Jan. 29, 1935

1,989,085

UNITED STATES PATENT OFFICE 1,989,085

MULTIPLE STOCK QUOTATION PROJECTING MACHINE

James W. Decker, New York, N. Y.

Application September 25, 1929, Serial No. 394,969
Renewed May 27, 1933

7 Claims. (Cl. 88—24)

This invention relates to an improved stock quotation projecting machine and more especially to a multiple stock quotation projecting machine.

Among the objects of the present invention it is aimed to provide an improved multiple stock quotation projecting machine in which with a single ticker and single tape, two images may be projected to screens disposed on opposite faces of two wall members.

These and other features, capabilities and advantages of the invention will appear from the sub-joined detail description of one specific embodiment thereof illustrated in the accompanying drawings in which Figure 1 is a transverse section of a wall showing a structure made according to the present invention diagrammatically in end elevation;

Fig. 2 is a side elevation of a machine made according to the present invention with the wall removed and showing one of the screens; and Fig. 3 is an enlarged plan view of the machine with the screens and wall removed.

In the embodiment shown, there are illustrated two wall members 1 and 2 parallel to one another, the wall member 1, in the present instance, being provided with a screen frame 3 having a screen 4 secured thereto to receive images reflected thereon by the mirror 5 inclined thereto to receive images projected thereto by the projecting lens member 6. The wall member 2, in the present instance, is provided with a screen frame 7 having a screen 8 secured thereto to which images are reflected from the mirror 9 received from the mirror 10, which mirror 10 is disposed to the receive images reflected thereto by the mirror 11 disposed below the same and in the path of the light rays and images coming from the mirror 12 disposed above the projecting lens member 13 to receive the images projected by such lens member 13.

In the present embodiment, a single ticker 14 is provided from which the tape 15, see Fig. 3, passes in a horizontal direction across the light aperture formed at the top of the extension 16 of the lamp housing 17. From the extension 16, the tape passes across the extension 18 of the lamp housing 19 and then down across the vertical light aperture formed along the side of the extension 18 to a suitable tape puller 23 beneath the extension 18 not shown. As the tape passes across the extension 16, the light rays from the lamp housing 17 pass up through the extension 16 and tape 15 forming images on the projecting lens member 13 secured to the top of the extension 16 by the bracket 20. The images formed in the projecting lens member 13 will be projected upwardly to the mirror 12 as aforesaid and then reflected by the mirror 12 to the mirror 11 and by the mirror 11 to the mirror 10 and by the mirror 10 to the mirror 9 and by the mirror 9 to the screen 8.

In turn, the light rays from the lamp housing 19 will pass through the extension 18 onto the mirror 21 and be reflected through the tape 15 onto the mirror 22 to form images in the mirror 22 which will be reflected upwardly to the lens projecting member 6 from which such images will be projected upwardly to the mirror 5 and reflected by the mirror 5 onto the screen 4.

It is obvious that various changes and modifications may be made to the details of construction without departing from the general spirit of the invention as set forth in the appended claims.

I claim:

1. The combination with a wall separating two trading rooms formed by two wall members, of a screen disposed in the upper portion of each wall member and facing into one of said rooms, a single ticker for printing records on a tape disposed adjacent to the floor between said wall members, two projecting mechanisms, one having a horizontal light aperture and the other a vertical light aperture, means for drawing the tape from said ticker successively across said horizontal light aperture then across said vertical light aperture in a direction parallel to said wall members, a mirror housing disposed adjacent to one of said screens and having one mirror inclining downwardly away from said screen to receive the images formed at said vertical light aperture and deflect them onto its screen, and a second mirror housing disposed adjacent to the other of said screens and having two mirrors both inclining upwardly away from its screen to receive the images formed at said horizontal light aperture and direct them onto said other screen, the lower mirror of said second mirror housing being disposed adjacent to and overlapping the single mirror in said first mirror housing in the interest of compactness.

2. The combination with two wall members forming a partition between two trading rooms, of projecting means for projecting the successive portions of a ticker tape, said projecting means being disposed adjacent to the lower end of one of said wall members and spaced from the other of said wall members to form standing space for the attendant, a screen disposed in the upper portion of each of said wall members and facing into one of said rooms, and optical systems for directing images of the successive portions of the tape from said projecting means to said screens respectively.

3. The combination with a wall separating two trading rooms formed by two wall members, of a screen disposed in the upper portion of each wall member facing into one of said rooms, there being a space formed between the lower portions of said wall members for a ticker and two projecting mechanisms, a horizontal light aperture for one of said projecting mechanisms, a vertical light aperture for the other of said projecting mechanisms, means for drawing the tape successively across said light apertures in a direction parallel to said wall members, said drawing means being also disposed between the lower portions of said wall members, a fixed mirror housing disposed adjacent to one of said screens having one fixed mirror therein to receive the images formed at said vertical light aperture and deflect them onto its screen, and a second fixed mirror housing disposed adjacent to the other of said screens and having two fixed mirrors therein to receive the images formed at said horizontal light aperture and direct them onto said other screen, the projecting mechanism for the horizontal light aperture being disposed to one side of the tape, the other projecting mechanism being disposed to the other side of the tape, the ticker being spaced from both of said projecting mechanisms and disposed in advance of the entrance end of the horizontal light aperture, and the tape drawing means being spaced from and disposed beyond the discharge end of the vertical light aperture.

4. The combination with a wall structure having two screens facing into different inspection areas, of a single ticker for printing records on a tape disposed below said screens, a housing having a horizontally extending light aperture and a vetrically extending light aperture, means for pulling the tape as it is printed successively across said light apertures, two lamps, one to either side of said housing, a mirror for receiving a beam of light from one of said lamps and directing it upwardly through said horizontally extending light aperture to the portion of the tape there disposed, a second mirror for receiving a beam of light from the other of said lamps and directing it laterally through said vertically extending light aperture to the portion of the tape there disposed, and reflecting means for each of said screens, one of said latter reflecting means for directing onto one of said screens the image impressed beam from the tape portion disposed at the horizontally extending light aperture and the other of said reflecting means for directing onto the other of said screens the image impressed beam from the tape portion disposed at the vertically disposed light aperture.

5. The combination with a wall separating two trading rooms formed by two wall members, of a screen disposed in the upper portion of each wall member facing into one of said rooms, there being a space formed between the lower portions of said wall members for a ticker and two projecting mechanisms, a horizontal light aperture for one of said projecting mechanisms, a vertical light aperture for the other of said projecting mechanisms, means for drawing the tape successively across said light apertures in a direction parallel to said wall members, said drawing means being also disposed between the lower portions of said wall members, and reflecting means for receiving the images formed at said horizontal light aperture and directing them to one of said screens and for receiving the images formed at said vertical light aperture and directing them to the other of said screens, the projecting mechanism for the horizontal light aperture being disposed to one side of the tape, the other projecting mechanism being disposed to the other side of the tape, the ticker being spaced from both of said projecting mechanisms and disposed in advance of the entrance end of the horizontal light aperture, and the tape drawing means being spaced from and disposed beyond the discharge end of the vertical light aperture.

6. The combination with a wall separating two trading rooms formed by two wall members, of a screen disposed in the upper portion of each wall member facing into one of said rooms, there being a space formed between the lower portions of said wall members for a ticker and two projecting mechanisms, a light aperture for each of said projecting mechanisms, means for drawing the tape successively across said light apertures in a direction parallel to said wall members, said drawing means being also disposed between the lower portions of said wall members, and reflecting means for each light aperture for receiving the images formed by such light aperture and directing them onto one of said screens, the projecting mechanisms being disposed on opposite sides of the light apertures, the ticker being spaced from both of said projecting mechanisms and disposed in advance of the entrance end of the first of said light apertures, and the tape drawing means being spaced from said projecting mechanisms and disposed beyond the discharge end of the second of said light apertures.

7. The combination with a wall separating two inspection areas, said wall structure having two screens, each screen facing into one of said inspection areas, of a single ticker for printing records on a tape disposed below said screens, two projecting mechanisms, a light aperture for each of said projecting mechanisms, means for drawing the tape successively across said light apertures, and reflecting means for each light aperture for receiving the images formed by such light aperture and directing them onto one of said screens, the projecting mechanisms being disposed on opposite sides of the light apertures, the ticker being spaced from both of said projecting mechanisms and disposed in advance of the entrance end of the first of said light apertures, and the tape drawing means being spaced from said projecting mechanisms and being disposed beyond the discharge end of the second of said light apertures.

JAMES W. DECKER.